(12) United States Patent
Askeland et al.

(10) Patent No.: US 12,065,153 B1
(45) Date of Patent: Aug. 20, 2024

(54) RESOLVING VEHICLE ISSUES BASED ON LOG DATA

(71) Applicant: Zoox, Inc., Foster City, CA (US)

(72) Inventors: Jacob Lee Askeland, San Jose, CA (US); Eleanor Pence, San Mateo, CA (US); James Howard Woodyatt, San Francisco, CA (US); Qifei Yu, La Jolla, CA (US)

(73) Assignee: Zoox, Inc., Foster City, CA (US)

( * ) Notice: Subject to any disclaimer, the term of this patent is extended or adjusted under 35 U.S.C. 154(b) by 145 days.

(21) Appl. No.: 17/553,547

(22) Filed: Dec. 16, 2021

(51) Int. Cl.
*B60W 50/02* (2012.01)
*B60W 50/14* (2020.01)

(52) U.S. Cl.
CPC ........ *B60W 50/0205* (2013.01); *B60W 50/14* (2013.01); *B60W 2050/146* (2013.01); *B60W 2556/45* (2020.02)

(58) Field of Classification Search
None
See application file for complete search history.

(56) References Cited

U.S. PATENT DOCUMENTS

| | | | | |
|---|---|---|---|---|
| 9,972,054 | B1 * | 5/2018 | Konrardy | G06Q 40/00 |
| 10,796,572 | B2 * | 10/2020 | Farr | G01C 21/3848 |
| 11,022,971 | B2 * | 6/2021 | Della Penna | G08G 1/0133 |
| 11,024,169 | B2 * | 6/2021 | Lassoued | G06V 20/56 |
| 11,182,986 | B2 * | 11/2021 | Sato | G07C 5/0841 |
| 11,358,601 | B2 * | 6/2022 | Smith | B60W 40/04 |
| 11,386,776 | B2 * | 7/2022 | Duggal | B60W 60/00188 |
| 11,403,492 | B2 * | 8/2022 | Valois | G06V 20/56 |
| 11,425,337 | B2 * | 8/2022 | Murao | G06V 10/96 |
| 11,628,788 | B2 * | 4/2023 | Troia | H04L 67/104 |
| | | | | 340/425.5 |
| 2014/0279707 | A1 * | 9/2014 | Joshua | G06Q 30/0283 |
| | | | | 701/1 |
| 2015/0178998 | A1 * | 6/2015 | Attard | G07C 5/008 |
| | | | | 701/23 |
| 2018/0155058 | A1 * | 6/2018 | Fenton | B64C 39/024 |
| 2018/0275667 | A1 * | 9/2018 | Liu | G01C 21/26 |

(Continued)

FOREIGN PATENT DOCUMENTS

| | | | | |
|---|---|---|---|---|
| AU | 2020344464 A1 * | 3/2022 | | B64C 39/024 |
| CA | 3045139 A1 * | 6/2018 | | B64C 39/024 |

(Continued)

*Primary Examiner* — Kevin R Steckbauer
(74) *Attorney, Agent, or Firm* — Lee & Hayes, P.C.

(57) ABSTRACT

Techniques for identifying and triaging issues associated with a vehicle in order to resolve the issues are described. The techniques may include receiving log data associated with a vehicle and generating an event timeline based at least in part on the log data. The event timeline may comprise a time-ordered record of events associated with operations of the vehicle. The techniques may also include identifying, based at least in part on an event included in the event timeline, a first occurrence of an issue associated with the vehicle. In some instances, a correlation may be determined between the first occurrence of the issue and a second occurrence of the issue, and a cause of the issue may also be determined based at least in part on the correlation. In some examples, the second occurrence of the issue may appear in the event timeline or another event timeline.

20 Claims, 6 Drawing Sheets

(56) References Cited

U.S. PATENT DOCUMENTS

| | | | |
|---|---|---|---|
| 2018/0276911 A1* | 9/2018 | Mcafee | G07C 5/08 |
| 2019/0220011 A1* | 7/2019 | Della Penna | G08G 1/0112 |
| 2020/0019173 A1* | 1/2020 | Chen | G05D 1/0285 |
| 2020/0118359 A1* | 4/2020 | Sato | H04W 4/38 |
| 2020/0307480 A1* | 10/2020 | Troia | G08G 1/205 |
| 2021/0074155 A1* | 3/2021 | Lassoued | G05D 1/0297 |
| 2021/0082292 A1* | 3/2021 | Sindhwani | G08G 5/0052 |
| 2021/0286359 A1* | 9/2021 | Della Penna | G05D 1/0212 |
| 2022/0051490 A1* | 2/2022 | Sato | H04W 4/38 |
| 2022/0173889 A1* | 6/2022 | Wilson | H04L 63/1408 |
| 2022/0188695 A1* | 6/2022 | Zhu | G06N 20/00 |

FOREIGN PATENT DOCUMENTS

| | | | | |
|---|---|---|---|---|
| CN | 110992516 A | * | 4/2020 | B60W 50/0205 |
| CN | 111028382 A | * | 4/2020 | G05D 1/0088 |
| CN | 113711571 A | * | 11/2021 | B60R 21/01 |
| DE | 102018116963 A1 | * | 1/2019 | G01C 21/32 |
| DE | 102017007180 A1 | * | 2/2019 | |
| DE | 102021120814 A1 | * | 6/2022 | B60W 60/001 |
| TW | 202044860 A | * | 12/2020 | B60R 21/01 |
| WO | WO-2018102638 A1 | * | 6/2018 | B64C 39/024 |
| WO | WO-2020012283 A1 | * | 1/2020 | G05D 1/0088 |
| WO | WO-2020197742 A1 | * | 10/2020 | B60R 21/01 |
| WO | WO-2021050177 A1 | * | 3/2021 | B64C 39/024 |
| WO | WO-2021101302 A1 | * | 5/2021 | B60W 30/14 |

\* cited by examiner

```
{
    "ISSUE":"ISSUE_1",
    "QUERY":{
        "WITHIN_DURATION":{
            "SECONDS":5.0,
            "MATCH":[
                ["EVENT_1"],
                [
                    "EVENT_2",
                    "EVENT_3"
                ],
                ["EVENT_4"]
            ]
        }
    }
}
```

200

```
{
    "ISSUE":"ISSUE_2",
    "QUERY":{
        "DURING_STATE":{
            "NAME":"STATE_1",
            "STATE":"OFF",
            "MATCH":[
                "EVENT_5",
            ]
        }
    }
}
```

RESOLVING VEHICLE ISSUES BASED ON LOG DATA

BACKGROUND

Autonomous vehicles can utilize complex systems, methods, and apparatuses to traverse an environment. Due to the complexity of these systems, however, troubleshooting errors associated with an autonomous vehicle can be difficult. For instance, when an error occurs, tracing the error back to its root cause can require a significant expense of time and resources due to the number of operations performed by the autonomous vehicle during a given period of operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates example pseudocode for issue matching algorithms usable to identify issues in stored log data.

DETAILED DESCRIPTION

Figure 1:
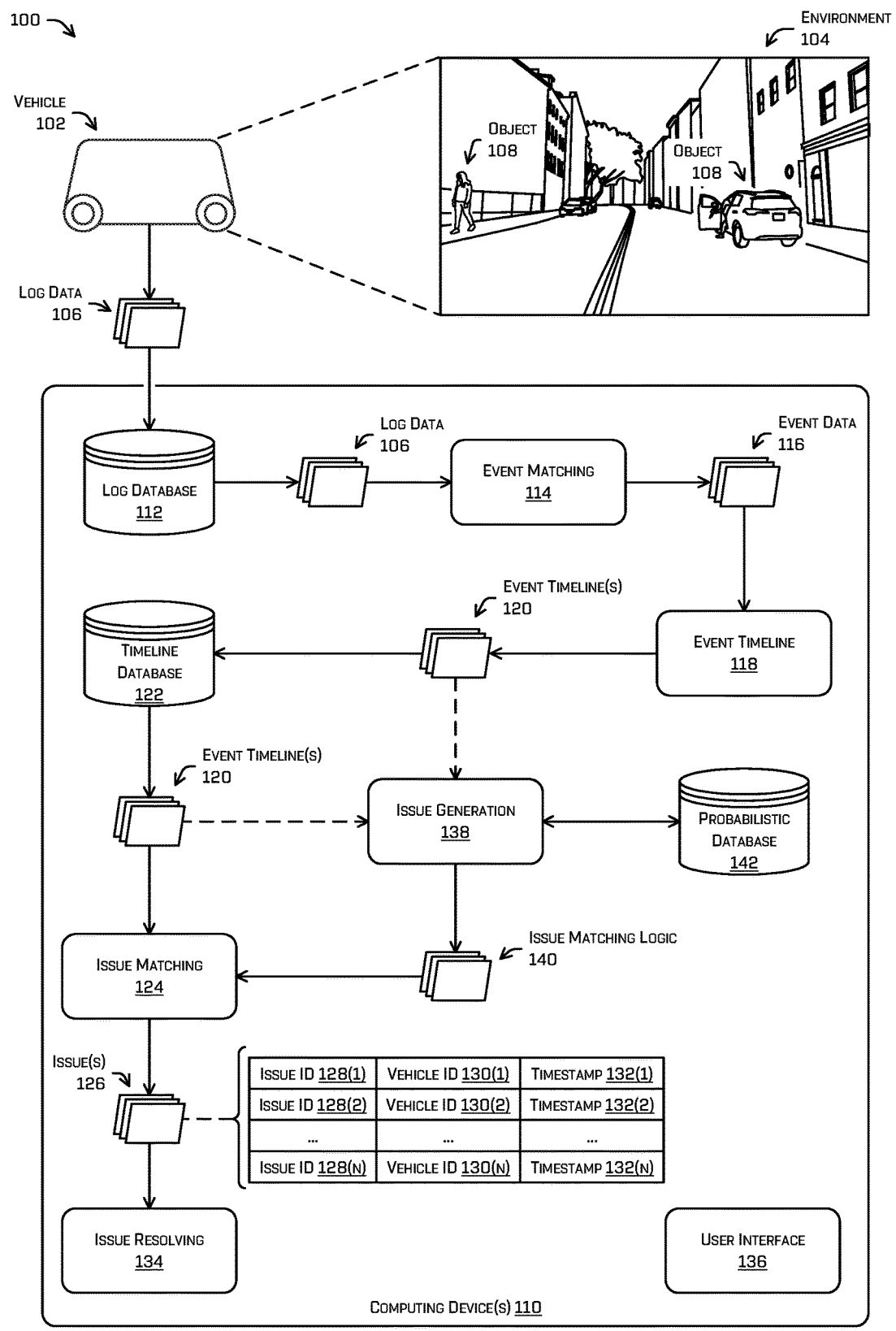
FIG. 1 is a pictorial flow diagram illustrating an example process according to the techniques described herein for identifying and triaging issues associated with a vehicle based on stored log data associated with the vehicle as it traversed an environment.

As noted above, autonomous vehicles can utilize highly complex systems, methods, and apparatuses to navigate through an environment. Due to this complexity, however, troubleshooting issues can be difficult. For instance, tracing issues back to corresponding cause(s) can require a significant expense of time and resources due to the number of operations performed by the autonomous vehicle during a given period of operation.

For example, an autonomous vehicle may operate in an environment and record log data during its period of operation. This log data may indicate any number of operations performed or events encountered by the autonomous vehicle during the period of operation. In some examples, if the autonomous vehicle experienced an issue (e.g., error, fault, etc.) during the period of operation, an engineer or other person associated with the autonomous vehicle may be required to analyze the log data in order to determine what caused the issue. In some instances, this could entail manually searching through a large number of system inputs/outputs recorded in the log data to determine what potentially caused the issue. In addition, once the cause of the issue is actually determined, the issue would still need to be resolved, which could consume additional time and resources.

This disclosure is directed to, among other things, techniques for identifying and triaging issues associated with an autonomous vehicle in order to resolve the issues quickly and efficiently. In some examples, the techniques may include generating an event timeline based at least in part on log data associated with the autonomous vehicle. In some instances, the event timeline may be a time-ordered record of events (e.g., inputs, outputs, faults, detections, etc.) associated with operations of the autonomous vehicle. In some examples, the techniques may also include storing, as an issue associated with the autonomous vehicle, an association between a selection (e.g., one or more) of the events. Based at least in part on the association, one or more occurrences of the issue may be identified in the event timeline, as well as, in some examples, other event timelines associated with the autonomous vehicle or another vehicle. Using these identified issues, a correlation may be determined between at least a first occurrence of the issue and a second occurrence of the issue. Based at least in part on this correlation, in some examples, a cause of the issue may be determined and the autonomous vehicle may be updated.

According to the techniques described herein, the performance of autonomous vehicles can be improved as issues can be reduced and/or eliminated. By automatically identifying and triaging issues associated with autonomous vehicles, issues can be resolved quickly and more efficiently than prior techniques. For instance, issues that have taken a significant amount of time (e.g., weeks, months, years, etc.) to resolve using prior techniques can be resolved in a much shorter amount of time (e.g., minutes, hours, days, etc.) using the techniques described herein, thereby reducing a number of computing cycles required to resolve issues. By way of example, an issue may occur when a vehicle would approach a traffic-light controlled intersection and a construction zone was beyond the intersection. The vehicle could shut down before the intersection because of a combination of event-related errors (e.g., the vehicle initiating a call to a remote operations device for guidance through the construction zone and an error associated with the traffic light). This issue could persist for months before engineers and programmers are able to diagnose the cause of the issue and resolve it. The techniques described herein may allow the cause to be identified in a much shorter period of time. Additionally, by reducing or eliminating issues associated with autonomous vehicles, the performance and safety of autonomous vehicles can also be improved. These and other improvements will be readily apparent to those having ordinary skill in the art.

By way of example, and not limitation a method according to the various technologies described herein may include receiving log data associated with a vehicle traversing an environment. In some examples, the environment may be a real environment and, in other examples, the environment may be a simulated environment. In some instances, the simulated environment may be based on the real environment. In some examples, the log data may be indicative of multiple inputs, outputs, faults, etc. associated with the vehicle. That is, in some examples, the log data may be a log file indicating when (e.g., using a timestamp) the vehicle performed certain operations during a period of operation. In some examples, the vehicle may be an autonomous vehicle.

In some examples, an event timeline may be generated based at least in part on the log data. For instance, the event timeline may comprise a time-ordered record of events associated with operations of the autonomous vehicle. In some examples, the various events of the event timeline may include, but are not limited to, events associated with starting the vehicle, stopping the vehicle, starting a component or system of the vehicle (e.g., autonomous mode, non-autonomous mode, etc.), shutting down a component or system of the vehicle, a state change, a fault of a component or system of the vehicle, a health state associated with a component or system of the vehicle, receiving sensor data, perceiving (e.g., detecting and/or classifying) objects based on the received sensor data, a planned path to traverse a route, initiating a call to a remote operations device associated with the vehicle, receiving guidance from the remote operations device, the vehicle encountering a construction zone, or the like. In some examples, the types of events that can be analyzed and/or represented on the event timeline may be configurable and events may be added or removed from consideration. In some examples, multiple event timelines may be generated and/or stored, and the multiple event timelines may be based on separate log data files.

In some examples, the techniques may include determining that the event timeline includes a problematic event. A problematic event may be an event that is defined such that an occurrence of the event is indicative of a failure, fault, error, or other problematic condition associated with an operation of the vehicle. For instance, a problematic event may indicate that a system or component of the vehicle (e.g., perception component, prediction component, planning component, localization component, etc.) was shut down (e.g., voluntarily or involuntarily).

In some examples, based at least in part on the event timeline including a problematic event, the techniques may include identifying or otherwise determining one or more events that at least partially contributed to the problematic event. In some examples, the one or more events may be a specific sequence of events included in the event timeline. The one or more contributing events may, in some examples, be related to the problematic event or unrelated to the problematic event. For instance, if the problematic event is a failure of a perception system of the vehicle, then the one or more events may include outputs of the perception system, inputs to the perception system, sensor-related events, or the like.

In some examples, the techniques may include receiving input data indicating a selection of events included in the time-ordered record of events. In some examples, the selection of events may include a selection of a single event and, in other examples, the selection may include multiple events. In some examples, the input data may be received via a user interface. That is, a user may specify the selection of certain events or event types, in some examples.

In some examples, the techniques may include storing, as an issue associated with the autonomous vehicle, an association between the selection of events. As used herein, an "issue" is an occurrence of one or more events (e.g., problematic events) that may be included in an event timeline. For instance, an issue may be identified as "occurring" within an event timeline when a specific number of specific events occur within a threshold period of time of each other, in a specific order, or the like. By way of example, and not limitation, an example issue could be identified as occurring in an event timeline if a first event occurs within two seconds of a second event. As another example, an issue could be identified as occurring in an event timeline if a combination of a first issue, second issue, and third issue is included in the event timeline in a particular order and/or within a threshold time of each other. There is no limit to the amount or types of issues that can be defined, and there is no minimum or maximum number of events that need to occur in an event timeline for an issue to occur. That is, an issue can be defined based on the occurrence of multiple events, a single event, or no event at all (e.g., an absence of an event).

In some examples, the techniques may include identifying one or more occurrences of the issue in the event timeline and/or in other event timelines based at least in part on the association. For instance, a first occurrence of the issue, a second occurrence of the issue, and so forth may be identified in the event timeline. Additionally, other occurrences of the issue may be identified in other event timelines. The other event timelines may be associated with the same vehicle or with other vehicles. That is, once an issue is defined, which may be performed in association with an event timeline associated with log data for a particular vehicle, the issue can subsequently be stored and run on different log data for the same or different vehicles to identify other occurrences of the issue. This can allow for identification in event timeline(s) of rare occurrences of issues (e.g., issues that occur infrequently), issues shared between multiple different vehicles, issues that are specific to a single vehicle, as well as when an issue began occurring. In some examples, each occurrence of an issue may be associated with an identifier corresponding with the vehicle and/or a timestamp indicating a time at which the issue occurred in the log data.

In some examples, the techniques may include determining a correlation between occurrences of the issue. For instance, a correlation may be determined between a first occurrence of the issue, a second occurrence of the issue, and so forth. In some examples, the correlation that is determined may be a correlation between events in the event timeline that lead up to the issue, events that are causing the issue, events that are related to the issue, or the like. In some examples, a cause of the issue may be determined based at least in part on the correlation. In some examples, the cause of the issue may be one or more components or systems of the vehicle that is causing the issue, one or more events associated with one or more components or systems of the vehicle that are causing the issue, or the like. For instance, based on the correlation, it may be determined that a specific event or event type consistently precedes occurrences of the issue, and that specific event or event type may be associated with a specific component or system of the vehicle. Based at least partially on this, the specific component or system of the vehicle can be updated to help minimize or resolve the issue.

In some examples, the techniques described herein may include a user interface that is configured to provide visualizations associated with identified issues, help users create/define issues, help users resolve issues, and the like. In examples, the user interface may be configured to cause display of a visual representation of the vehicle traversing the environment at a time corresponding with an occurrence of an issue. In another example, the user interface may cause presentation of the event timeline including multiple inputs corresponding with the time-ordered record of events such that selections of the events may be received (e.g., by a user selecting one of the inputs).

The techniques described herein can be implemented in a number of ways. For instance, while the events and issues described above and herein are in the context of outputs, inputs, faults, etc. of an autonomous vehicle, it is also contemplated that issues may be associated with a behavior of the autonomous vehicle and the events can be associated with a specific maneuver of the vehicle, a sequence of maneuvers of the vehicle, a detection of an object in an environment of the vehicle, a prediction associated with the object, or a classification change associated with the object, for example. In addition, while the examples above and herein are described as identifying issues in log data after a period of operation, the techniques described herein can be utilized in real-time or near-real time on the vehicle itself during the period of operation.

According to the techniques described herein, the performance of autonomous vehicles can be improved as issues can be reduced and/or eliminated. By automatically identifying and triaging issues associated with autonomous vehicles, issues can be resolved quickly and more efficiently. In comparison to on-board diagnostics ports (e.g., OBD2 ports) of vehicles that simply just output a list of faults, the techniques described herein improve techniques for resolving vehicle-related issues by pattern matching different occurrences of an issue across multiple vehicles, in some instances, to determine a potential cause of the issue. Additionally, by reducing or eliminating issues associated with autonomous vehicles, the safety of operating autonomous vehicles can also be improved. These and other improvements will be readily apparent to those having ordinary skill in the art.

Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in an aviation or nautical context, or in other machine-learning and training contexts. Furthermore, the techniques described herein can be used with real data (e.g., captured using sensor(s)), simulated data (e.g., generated by a simulator), or any combination of the two.

FIG. 1 is a pictorial flow diagram illustrating an example process 100 according to the techniques described herein for identifying and triaging issues associated with a vehicle 102. In examples, the vehicle 102 may be associated with one or more components or systems. The one or more components or systems of the vehicle 102 may generate log data 106 associated with the vehicle 102 traversing an environment 104. The log data 106 may be indicative of operations performed by the vehicle 102 and/or the components or systems of the vehicle 102 during a period of operation. For instance, the log data 106 may indicate various inputs, outputs, faults, or other information associated with operations of the vehicle 102. In some examples, the log data 106 may include raw sensor data and/or data based on sensor data (e.g., bounding boxes, velocities, classifications, object dimensions, etc.). Examples of data generated by a vehicle that can be included in the log data 106 can be found, for example, in U.S. patent application Ser. No. 15/644,267 titled "Interactions Between Vehicle and Teleoperations System" and filed Jul. 7, 2017 (describing communication signals that can include sensor data and data indicating an occurrence of an event as well vehicle control data that can be derived from data received from a sensor and a planner, an object data calculator, an object classifier, a collision predictor system, a kinematics calculator, a safety system actuator, and a control operation of the drive system), U.S. patent application Ser. No. 15/693,700 titled "Occupant Protection System Including Expandable Curtain and/or Expandable Bladder" and filed Sep. 1, 2017 (describing data representative of a trajectory of the vehicle, location data, object data, and vehicle control data, and U.S. patent application Ser. No. 16/198,653 titled "Executable Component Interface and Controller" filed Nov. 21, 2018 (describing a type of log data), which are each incorporated herein by reference in their entirety and for all purposes.

In examples, the vehicle 102 may include one or more sensor component(s) that capture sensor data associated with the environment 104 surrounding the vehicle 102. The environment 104 may include one or more objects 108, such as vehicles, pedestrians, cyclists, animals, vegetation, buildings, road network features, etc. In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data associated with the environment 104, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc. In various examples, the log data 106 may include some or all of the sensor data generated by the sensor component(s) during a period of operation of the vehicle 102 in the environment 104.

In some examples, the log data 106 may be sent to one or more computing device(s) 110 associated with the vehicle 102. In some examples, the one or more computing device(s) 110 may be remote from the vehicle 102 (e.g., accessible to the vehicle 102 via one or more network(s)) or the one or more computing device(s) 110 may be on board the vehicle 102. The computing device(s) 110 may store the log data 106 in a log database 112. Although illustrated in FIG. 1 as being part of the computing device(s) 110, it is contemplated that the log database 112 can be an external database that is accessible to the computing device(s) 110 via a network. The log database 112 may store multiple instances or files of log data 106 associated with the vehicle 102, as well as multiple other vehicles. The other vehicles may, in some examples, be similar to the vehicle 102. In some examples, the vehicle 102 and the multiple other vehicles may be part of a fleet of vehicles (e.g., fleet of autonomous vehicles). As such, each one of the multiple instances of log data 106 stored by the log database 112 may be associated with a specific vehicle, a specific period of operation, a specific environment, or the like.

In some examples, the log data 106 may be received by an event matching component 114. In some examples, the event matching component 114 may analyze the log data 106 to generate or otherwise determine event data 116. That is, the event matching component 114 may analyze the log data to identify specific events that occurred while the vehicle 102 was traversing the environment 104. As such, the event data 116 may indicate the one or more specific events that occurred while the vehicle 102 was traversing the environment 104. For instance, the specific events may indicate operations of the vehicle 102 that are associated with starting the vehicle 102, stopping or shutting down the vehicle 102, starting a component or system of the vehicle 102 (e.g., autonomous mode, non-autonomous mode, etc.), shutting down a component or system of the vehicle 102, a state change of the vehicle 102 or a component or system of the vehicle 102, a fault of a component or system of the vehicle 102, a health state associated with a component or system of the vehicle 102, or the like. In some examples, an event may comprise a data structure that includes an event name, a timestamp, and a vehicle identifier. In some examples, the event matching component 114 may pattern match events in the log data 106 and report found matches as a timestamp. In various examples, events can be defined manually (e.g., by a user) or automatically (e.g., using machine-learning or another computer-based algorithm).

In some examples, the event data 116 may be received by an event timeline component 118. The event timeline component 118 may utilize the event data 116 to generate or otherwise determine one or more event timeline(s) 120. In examples, an event timeline 120 may comprise a data structure (e.g., timeline, table, list, tree, etc.) that includes a time-ordered record of the specific events associated with the operations of the vehicle 102 during the period of operation in the environment 104. That is, the event timeline component 118 may receive, as an input, the event data 116 and organize the included events into a time-ordered record, table, or other data structure. In this way, the events can be ordered chronologically such that it can be determined which events occurred before or after other events. In some examples, the events may be associated with a timestamp indicating time of occurrence instead of, or in addition to, being arranged into a timeline.

In some examples, the one or more event timeline(s) 120 may be stored in a timeline database 122. Although illustrated in FIG. 1 as being part of the computing device(s) 110, it is contemplated that the timeline database 122 can be an external database that is accessible to the computing device(s) 110 via a network. The timeline database 122 may store multiple event timelines 120 associated with the vehicle 102, as well as multiple other vehicles. As such, each one of the multiple event timelines 120 may be determined based on a different instance of log data 106, in some examples. Additionally, each one of the multiple event timelines 120 may also be associated with a specific vehicle, a specific period of operation, a specific environment, or the like.

In some examples, an issue generation component 138 may utilize the event timeline(s) 120 to generate or otherwise determine issue matching logic 140. Additionally, or alternatively, the issue generation component 138 may utilize probabilistic data stored in the probabilistic database 142 to determine the issue matching logic 140. That is, the issue generation component may utilize the probabilistic data instead of, or in addition to, the event timeline(s) 120 to generate the issue matching logic 140. In some examples, the issue generation component 138 may determine issue matching logic 140 by determining correlations or associations between problematic events appearing in the event timeline(s) 120 and other events that potentially contributed to the problematic events. For instance, when an even that is known to be problematic is present in the event timeline(s) 120 (e.g., present across one or multiple even timelines), the issue generation component 138 may correlate backwards in time to determine a sequence of one or more events that, probabilistically, led to the occurrence of the problematic event. These backwards correlations may be performed over multiple event timelines in order to determine a highest probability of which specific events or combination thereof lead to the problematic event. For instance, a problematic event may be a failure of a component or system of the vehicle, and the one or more correlated events leading up to the failure may be an activation or deactivation of a particular component or system of the vehicle, a failure of another component or system of the vehicle, a change in an attribute associated with the vehicle, a change in an environmental condition associated with the environment 104, a detection of an object 108 in the environment 104, a prediction of an object 108 in the environment 104, or the like.

In some examples, these techniques can be used to automatically determine an event that likely contributes to an issue. Such information can be presented to a user in a table format or when a use selects a specific event or issue. For example, a user may be presented with probabilities of various events that may have contributed to like issues over several timelines (using the techniques disclosed herein to show correlation based on time or other attributes). Similarly, a user may be presented with a list of issues that may lead from an event with corresponding probabilities. Based on a number of occurrences of event to issues correlations and/or probabilities, the correlations can be categorized for a user. E.g., a first event can be categorized as an event that is highly likely to lead to a corresponding issue based on a number of occurrences/probabilities of timelines indicating this correlation. A second event can be categorized as rarer event if, for example, a similar approach indicates fewer occurrences or lower probabilities. In other words, the categories can be based on threshold numbers of occurrences or probabilities of correspondence between issues and events.

In some examples, issue matching logic may be manually defined (e.g., by a user via a user interface 136) based at least in part on the event timeline(s) 120, the probabilistic data, or other data. In some examples, a user may compose a portion of issue matching logic, and the system may provide a list of issue matches and some helpful possible categorizations based on typical events that occur around that issue. In some examples, the probabilistic database 142 may store probabilistic data, such as relationships between events, sequences of events that lead to problematic events, probabilities indicating how often certain events (e.g., problematic events) are preceded by one or more other specific events or specific sequences of events, or the like. As noted above, the probabilistic data may be used by the issue generation component 138 to generate issue matching logic 140, as well as used by a user to manually define issue matching logic 140. In some examples, the issue generation component 138 may determine the probabilistic data based at least in part on the event timeline(s) 120 and store the probabilistic data in the probabilistic database 142.

In examples, an issue matching component 124 of the computing devices 110 may receive or otherwise obtain the event timeline(s) 120 and identify one or more occurrences of various issue(s) 126 associated with the vehicle 102 and/or the other vehicles. For instance, the issue matching component 124 may utilize the issue matching logic 140 to identify occurrences of the issue(s) 126 in the event timeline(s) 120 based on the event timeline(s) including (e.g., indicating an occurrence of) specific events, specific combinations of event, specific combinations of events that occurred within a threshold period of time, or the like.

In some examples, the issue(s) 126 that are identified by the issue matching component 124 may each include a specific issue identifier 128(1)-128(N) (e.g., which may be indicative of an issue type), a specific vehicle identifier 130(1)-130(N), and/or a timestamp 132(1)-132(N) of when the issue occurred in the event timeline 120 (where N represents any number greater than or equal to one). In this way, individual issue(s) 126 may be correlated by an issue resolving component 134. For instance, issue(s) 126 may be correlated based on their issue identifier 128 and/or their vehicle identifier 130. As such, whether an issue is vehicle specific or occurring across multiple vehicles may be determined, as just an example.

In some examples, the issue resolving component 134 may, using the issue(s) 126, determine correlations between different occurrences of various issue(s) 126. For instance, the issue resolving component 134 may determine a correlation between a first occurrence of an issue, a second occurrence of the same issue, and so forth. In some examples, the issue resolving component 134 may additionally, or alternatively, determine correlations between events in the event timeline(s) 120 that lead up to certain issue(s) 126, events that are causing the issue(s) 126, events that are related to the issue(s) 126, or the like. In some examples, a cause of an issue 126 may be determined by the issue resolving component 134 based at least in part on a determined correlation between issue occurrences. In some examples, the cause of the issue may be one or more components or systems of the vehicle 102 that are causing the issue, one or more events associated with one or more components or systems of the vehicle 102 that are causing the issue, or the like. For instance, based on a correlation, the issue resolving component 134 may determine that a specific event precedes an occurrence of a specific issue 126, and that specific event may be associated with a specific component or system of the vehicle 102. Based at least partially on this, the specific component or system of the vehicle 102 can be updated to help minimize or resolve the issue 126.

In some examples, the one or more computing device(s) 110 may also include a user interface component 136. In some examples, the user interface component 136 may assist non-programmers or other users in creating issue matching logic. For instance, the user interface component 136 may include a keyword matching features that, in some examples, can automatically suggest types of events based on a partial user input. Additionally, in some examples, the user interface component 136 may include a component that, while an issue is being defined by a user, the component may present the user with some matches of the issue in event timeline(s) 120 and/or identifies existing, similar issues. In some examples, the user interface component 136 may be configured to give tutorials to new users about creating issue matching logic, as well as present pre-composed example issue matching logic. In some examples, the user interface component 136 may cause presentation of an issue matching history associated with certain issues. For instance, the issue matching history may indicate, among other things, a message such as "No new issues found in the past week," or the like. In another example, the user interface component 136 may cause presentation of or otherwise automatically indicate whether an update to the vehicle 102 has possibly resolved an issue 126.

While the various components described in FIG. 1 are part of a distributed system, it is contemplated that the components could be part of a system that is not distributed. For instance, it is contemplated that the event matching component 114 and the event timeline component 118 could be a same component, that the issue matching component 124 and the issue resolving component 134 could be a same component, or the like. In other words, any of the components or operations performed by the components described in FIG. 1 could be combined with other components or performed by other components.

FIG. 2 illustrates example pseudocode 200 and 202 for issue matching algorithms. Actual code similar to the example pseudocode 200 and 202 may be stored as issue matching logic by the issue matching component 124 for identifying issues within an event timeline 120. In some examples, the actual code similar to the example pseudocode 200 and 202 may be determined by a user or automatically using machine-learning or other computer-based algorithms. In the example pseudocode 200 and 202, the issue is matched when the conditions of a query are met. For instance, issue_1 of the pseudocode 200 is matched when event_1 precedes event_4 and, within 5 seconds between the occurrence of event_1 and event_4, event_2 and event_3 also occur. As another example, issue_2 of the pseudocode 202 is matched when the vehicle is not operating in state_1 and, while not operating in state_1, event_5 occurs.

Figure 3:
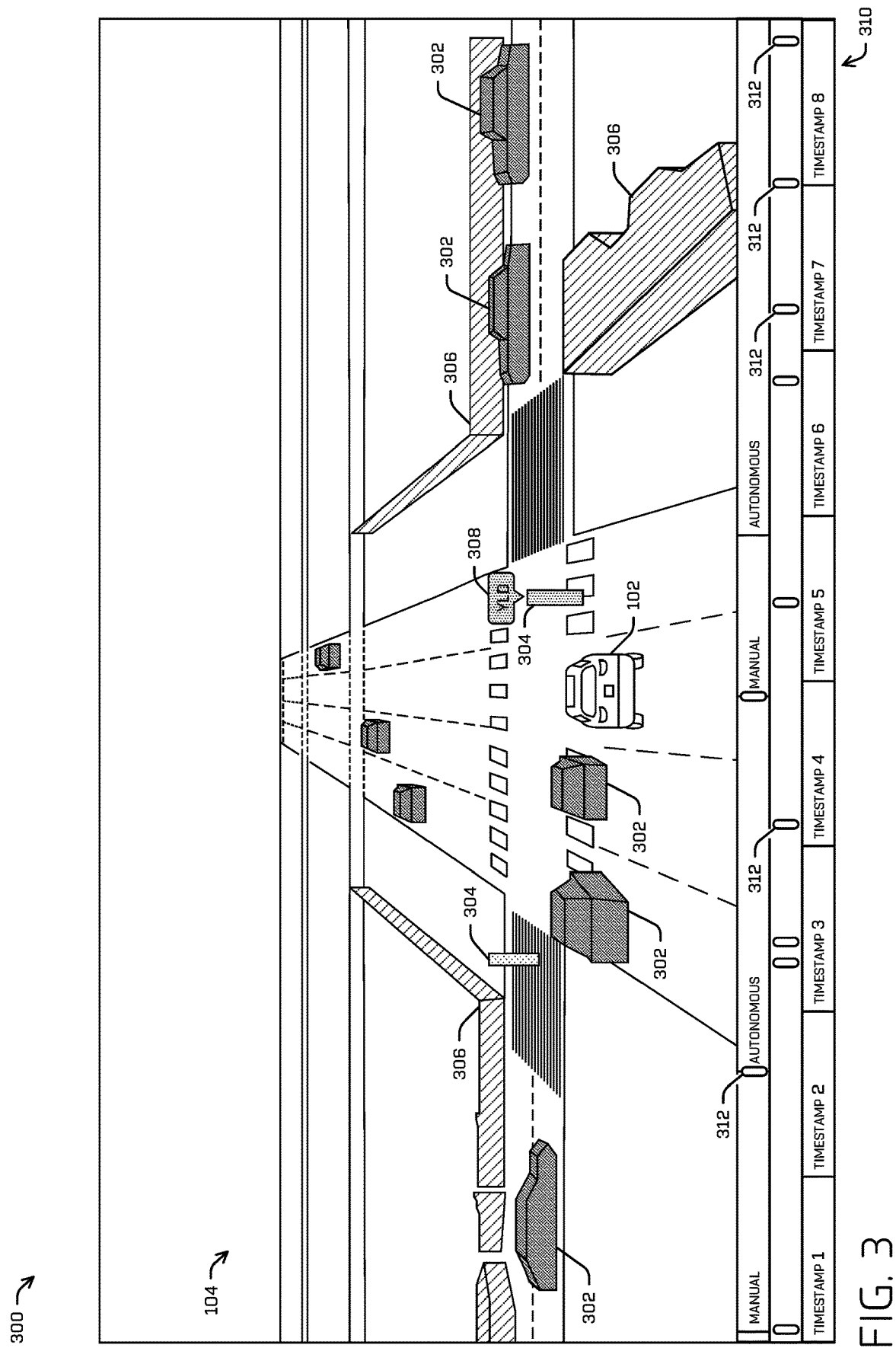
FIG. 3 illustrates an example user interface that can be utilized for identifying and triaging issues associated with a vehicle.

FIG. 3 illustrates an example user interface 300 that can be utilized for identifying and triaging issues associated with a vehicle. The user interface may include a visual representation of the environment 104 in which the vehicle 102 is operating. The environment 104 may include one or more objects, such as other vehicles 302, pedestrians 304, and static objects 306 (e.g., buildings, walls, vegetation, structures, etc.). In some examples, the user interface 300 may also cause presentation of contextual information associated with the objects, such as an indication 308 that the vehicle 102 is to yield to the pedestrian 304.

In some examples, the user interface 300 may also include an event timeline 310. The event timeline 310 may indicate information associated with the operations of the vehicle 102 with respect to various period of time, which may be separated into different timestamp intervals. For instance, during the time period between timestamp 2 and timestamp 3, the vehicle 102 transitions from manual mode to autonomous mode, and an event 312 occurs at that time. For instance, the event 312 may be associated with the transition of the vehicle from manual mode to autonomous mode. The event timeline 310 also includes multiple other events 312.

In some examples, each of the events 312 may be inputs that are individually selectable. For instance, an event 312 may be selected and the user interface 300 may cause presentation of additional information associated with the event, such as a name of the event 312, a time of the event 312, a geographical location of the event 312, potential issues associated with the event 312, and the like. Additionally, in some examples, when an event 312 is selected, the visual representation of the environment 104 may be updated to correspond to a time associated with the selected event 312. In some examples, one or more of the events 312 may be selected, and issue matching logic may be generated based on the selection of the events 312. For instance, when the one or more events 312 are selected, the user interface 300 may prompt a user as to whether or not they would like to create a new issue.

In some examples, a user may filter the events 312 displayed on the event timeline so that more or less events are shown. For instance, a user may select one of the events 312 and then choose to filter out other events 312 so that only events 312 similar to the selected event 312 are displayed. In some examples, events 312 may be filtered based on a selection of an issue associated with the vehicle 102. For instance, only events 312 that may contribute to the issue may be displayed.

In some examples, instead of, or in addition to, the event timeline 310 including events 312, the event timeline 310 can include issues. The issues may be selectable as inputs similar to the events 312, and when selected, the user interface 300 may cause presentation of information associated with the issues, such as which events contributed to the issue, whether the issue has been resolved, when the issue first started, other issues similar to the issues, and the like.

Figure 4:
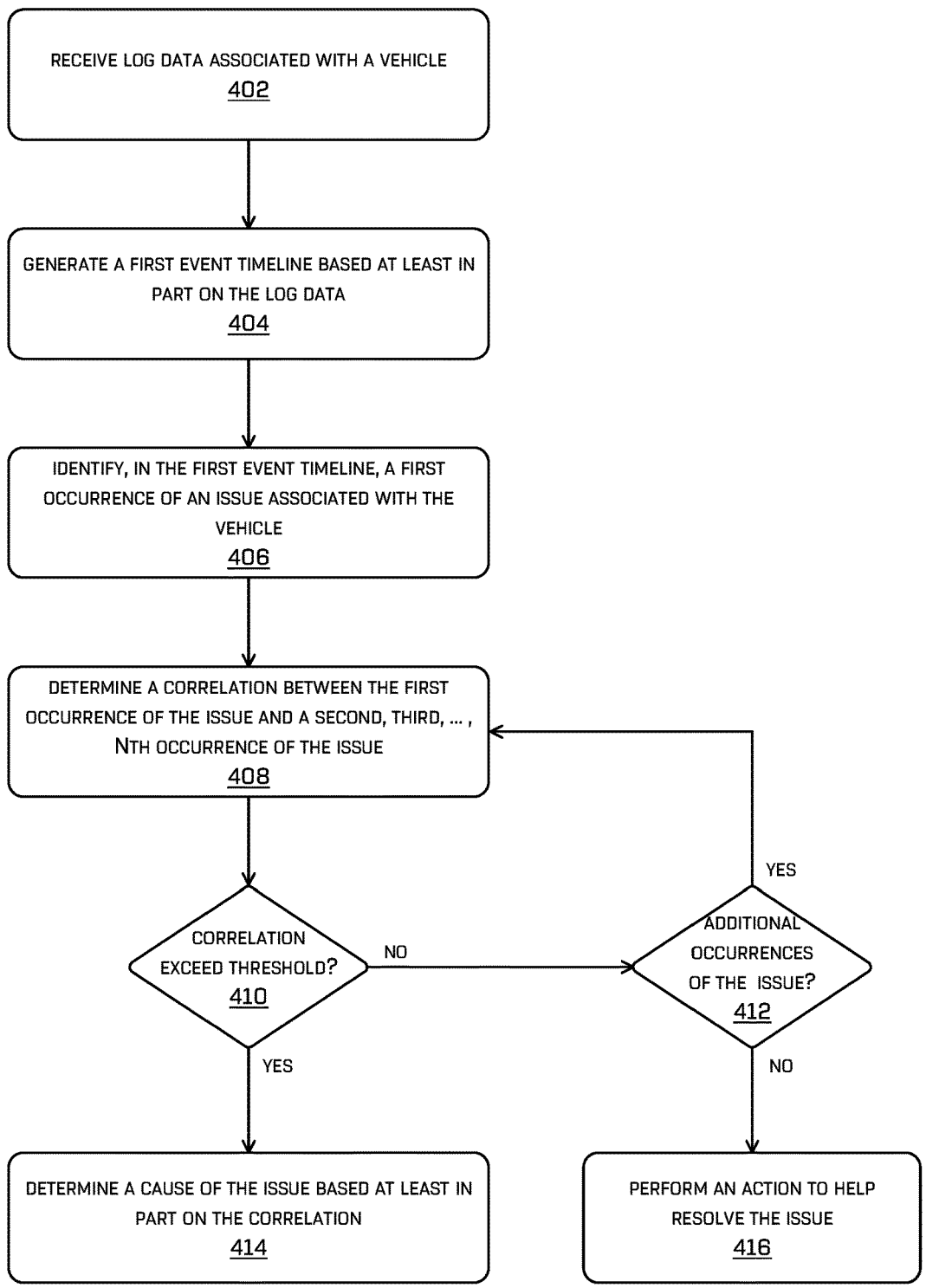
FIG. 4 is a flowchart illustrating an example method associated with identifying and triaging issues associated with a vehicle.

FIG. 4 is a flowchart illustrating an example method 400 associated with identifying and triaging issues associated with a vehicle. The method 400 illustrated in FIG. 4 is described with reference to one or more of the vehicles, systems, and/or user interfaces described in FIGS. 1-3 for convenience and ease of understanding. However, the method 400 is not limited to being performed using the vehicles, systems, and/or user interfaces described in FIGS. 1-3, and may be implemented using any of the other vehicles, systems, and user interfaces described in this application, as well as vehicles, systems, and user interfaces other than those described herein. Moreover, the vehicles, systems, and user interfaces described herein are not limited to performing the method 400.

The method 400 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the method 400 may be omitted entirely. Moreover, the method 400 may be combined in whole or in part with other methods.

The method 400 begins at operation 402, which includes receiving log data associated with a vehicle. For instance, the event matching component 114 may receive the log data 106 from the log database 112 or from the vehicle 102. In some examples, the log data may be associated with the vehicle traversing an environment. In some examples, the log data may be indicative of operations performed by the vehicle and/or components or systems of the vehicle during a period of operation. For instance, the log data may indicate various inputs, outputs, faults, or other information associated with operations of the vehicle.

At operation 404, the method 400 includes generating a first event timeline based at least in part on the log data. For instance, the event timeline component 118 may generate the first event timeline 120 based at least in part on the log data 106. In examples, the first event timeline may comprise a time-ordered record of events associated with operations of the vehicle. In some examples, the various events included in the first event timeline may include, but are not limited to, events associated with starting the vehicle, stopping the vehicle, starting a component or system of the vehicle (e.g., autonomous mode, non-autonomous mode, etc.), shutting down a component or system of the vehicle, a state change, a fault of a component or system of the vehicle, a health state associated with a component or system of the vehicle, or the like.

At operation 406, the method 400 includes identifying, in the first event timeline, a first occurrence of an issue associated with the vehicle. For instance, the issue matching component 124 may identify the first occurrence of the issue 126 associated with the vehicle 102 in the first event timeline 120. In some examples, the first occurrence of the issue may be identified in the first event timeline based on one or more events included in the first event timeline. For instance, the first occurrence of the issue may be identified in the first event timeline based on the first event timeline including (e.g., indicating an occurrence of) one or more specific events, specific combinations of events, specific combinations of events that occurred within a threshold period of time, or the like.

At operation 408, the method 400 includes determining a correlation between the first occurrence of the issue and a second occurrence of the issue, a third occurrence of the issue, . . . , and an Nth occurrence of the issue, where "N" can represent any number. That is, the correlation may be determined between two occurrences of the issue, three occurrences of the issue, four occurrences of the issue, and so forth. For instance, the issue resolving component 134 may determine the correlation between the first occurrence of the issue and the second occurrence of the issue, the third occurrence of the issue, . . . , and the Nth occurrence of the issue. In some examples, the correlation between the occurrences of the issues may be correlations between events that preceded the issues, events that occurred after the issues, events associated with the issue that did not occur, environmental factors that may have contributed to the issue, vehicle behaviors that may have contributed to the issue, or the like.

At operation 410, the method 400 includes determining whether the correlation meets or exceeds a threshold correlation. If the correlation does not meet or exceed the threshold correlation (e.g., is less than the threshold), the method 400 proceeds to operation 412. However, if the correlation does meet or exceed the threshold correlation, the method 400 proceeds to operation 414. In some examples, the issue resolving component 134 may determine whether the correlation meets or exceeds the threshold correlation.

At operation 412, the method 400 includes determining whether additional occurrences of the issue exist in the first event timeline or other event timeline(s). If additional occurrences of the issue exists, the method 400 proceeds back to operation 408. However, if no additional occurrences of the issue exist, the method 400 proceeds to operation 416. That is, if the correlation is less than the threshold correlation, the system may determine whether additional data exists to try and raise the correlation to meet or exceed the threshold.

At operation 414, the method 400 includes determining a cause of the issue based at least in part on the correlation. For instance, the issue resolving component 134 may determine the cause of the issue based at least in part on the correlation. In some examples, the cause of the issue may be determined to be one or more components or systems of the vehicle 102, one or more events associated with one or more components or systems of the vehicle 102, or the like. For instance, based on the correlation, the issue resolving component 134 may determine that a specific event precedes each different occurrence of the issue, and that specific event may be associated with a specific component or system of the vehicle.

At operation 416, the method 400 includes performing an action to help resolve the issue. In some examples, the action may comprise re-defining the issue matching logic to add or remove certain events or other parameters. Additionally, or alternatively, the action may comprise outputting an indication on a user interface that more log data may be required to resolve the issue. That is, a minimum number of occurrences of the issue may not be available in order to fully resolve the issue.

Figure 5:
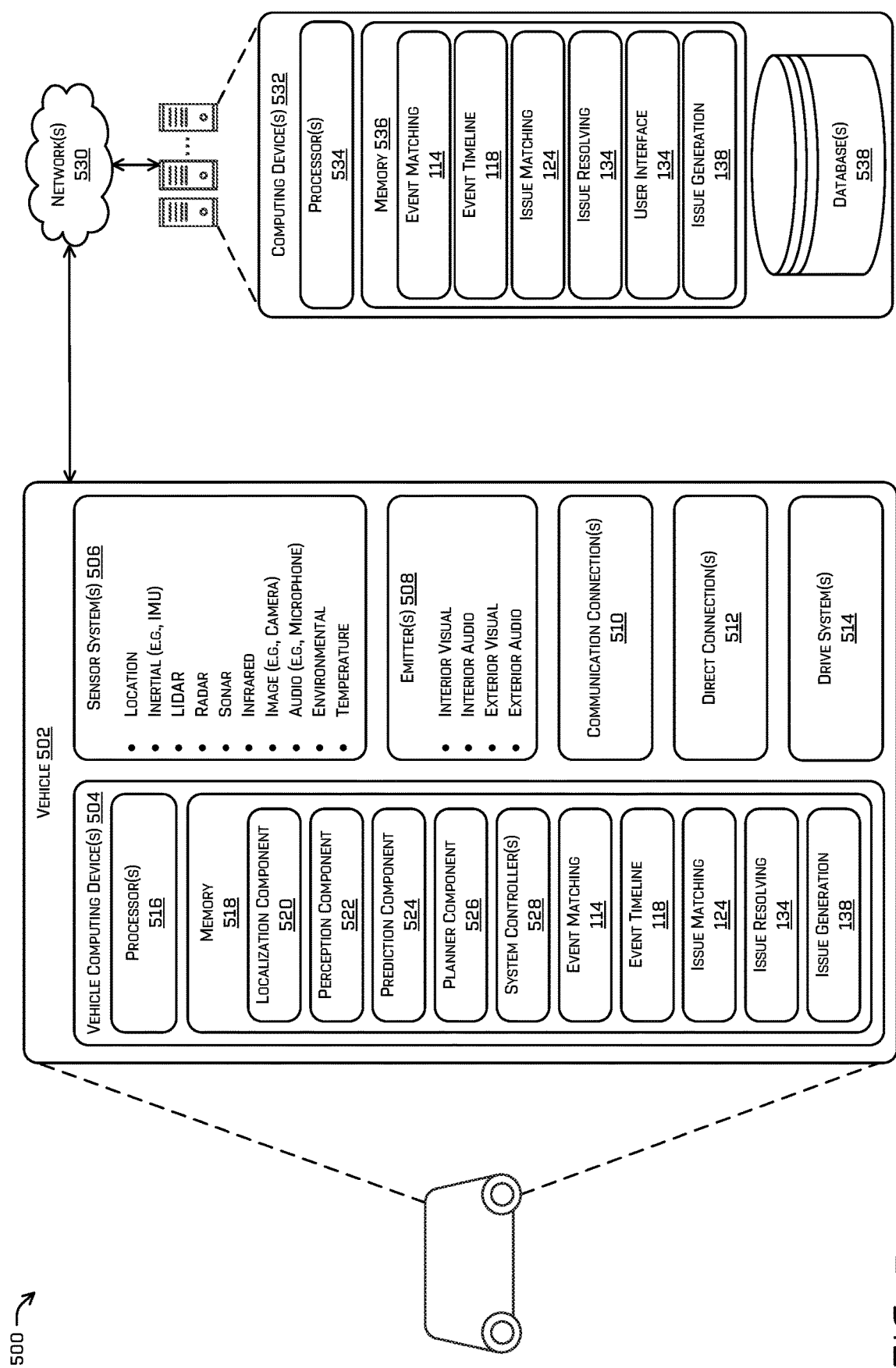
FIG. 5 is a block diagram illustrating an example system that may be used for performing the techniques described herein.

FIG. 5 is a block diagram illustrating an example system that may be used for performing the techniques described herein. In at least one example, a vehicle 502, which can correspond to the vehicle 102 described above with reference to FIGS. 1-4, can include one or more vehicle computing device(s) 504 (which may correspond with the computing device(s) 110), one or more sensor systems 506, one or more emitters 508, one or more communication connections 510, at least one direct connection 512, and one or more drive systems 514. In examples, the events and issues described herein may be events and issues corresponding with one or more of the systems and components of the vehicle 502.

In at least one example, a vehicle 502 can be an autonomous vehicle configured to operate according to a Level 6 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 502 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 502 is an autonomous vehicle; however, the vehicle 502 could be any other type of vehicle. While only a single vehicle 502 is illustrated in FIG. 5, in a practical application, the example system 500 can include a plurality of vehicles, which, in some examples, can comprise a fleet of vehicles.

The vehicle computing device(s) 504 can include processor(s) 516 and memory 518 communicatively coupled with the processor(s) 516. In the illustrated example, the memory 518 of the vehicle computing device(s) 504 stores a localization component 520, a perception component 522, a prediction component 524, a planner component 526, one or more system controller(s) 528, the event matching component 114, the event timeline component 118, the issue matching component 124, the issue resolving component 134, and the issue generation component 138.

In at least one example and as described above, the localization component 520 can determine a pose (position and orientation) of the vehicle 502 in relation to a local and/or global map based at least in part on sensor data received from the sensor system(s) 506 and/or map data associated with a map of an environment in which the vehicle 502 is operating. In at least one example, the localization component 520 can include, or be associated with, a calibration component that is capable of performing operations for calibrating (determining various intrinsic and extrinsic parameters associated with any one or more of the sensor system(s) 506), localizing, and mapping substantially simultaneously.

In at least one example, the perception component 522 can perform object detection, segmentation, and/or classification based at least in part on sensor data received from the sensor system(s) 506. In at least one example, the perception component 522 can receive raw sensor data (e.g., from the sensor system(s) 506). In at least one example, the perception component 522 can receive sensor data and can utilize one or more processing algorithms and/or machine-learned models to perform object detection, segmentation, and/or classification with respect to object(s) identified in the sensor data. In some examples, the perception component 522 can associate a bounding region (e.g., bounding box or otherwise an instance segmentation) with an identified object and can associate a confidence score associated with a classification of the identified object with the identified object.

The prediction component 524 can receive sensor data from the sensor system(s) 506, map data, and/or perception data output from the perception component 522 (e.g., processed sensor data), and can output predictions associated with one or more objects within the environment of the vehicle 502. Predictions can include predicted trajectories associated with objects in the environment in which the vehicle 502 is operating.

The planner component 526 may receive data, information, and/or outputs from the localization component 520, the perception component 522, the prediction component 524, as well as map data, and may generate one or more proposed vehicle operations (e.g., proposed trajectories). Additional details of localization components, perception components, prediction components, and/or planner components that are usable can be found in U.S. Pat. No. 9,512,123, issued on Apr. 4, 2017, and U.S. Pat. No. 10,353,390, issued on Jul. 16, 2019, the entire contents of both of which are incorporated by reference herein in their entirety and for all purposes. In some examples (e.g., where the vehicle 502 is not an autonomous vehicle), one or more of the aforementioned components can be omitted from the vehicle 502.

In at least one example, the vehicle computing device(s) 504 can include one or more system controller(s) 528, which can be configured to control steering, propulsion, braking, safety, emitters, communication, and other systems of the vehicle 502. These system controller(s) 528 can communicate with and/or control corresponding systems of the drive system(s) 514 and/or other systems of the vehicle 502.

While the components described above are illustrated as "onboard" the vehicle 502, in other implementations, the components can be remotely located and/or accessible to the vehicle 502. For instance, the component can be remotely located on the computing device(s) 532 and accessible to the vehicle 502 via one or more network(s) 530. Furthermore, while the components are described above as "components," such components can comprise one or more components and/or modules, which can be part of a system, for performing operations attributed to each of the components.

In at least one example, the localization component 520, the perception component 522, the prediction component 524, the planner component 526, the event matching component 114, the event timeline component 118, the issue matching component 124, and the issue resolving component 134 can process data, as described above, and can send their respective outputs over the network(s) 530, to computing device(s) 532. In at least one example, the localization component 520, the perception component 522, the prediction component 524, the planner component 526, the event matching component 114, the event timeline component 118, the issue matching component 124, and the issue resolving component 134 can send their respective outputs to the computing device(s) 532 at a particular frequency, after a lapse of a predetermined period of time, in near real-time, etc.

In at least one example, the sensor system(s) 506 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 506 can provide input to the vehicle computing device(s) 504. In some examples, the sensor system(s) 506 can preprocess at least some of the sensor data prior to sending the sensor data to the vehicle computing device(s) 504. In at least one example, the sensor system(s) 506 can send sensor data, via the network(s) 530, to the computing device(s) 532 at a particular frequency, after a lapse of a predetermined period of time, in near real-time, etc.

The vehicle 502 can also include one or more emitters 508 for emitting light and/or sound, as described above. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), or the like. The emitter(s) 508 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 508 can be positioned at various locations about the exterior and/or interior of the vehicle 502.

The vehicle 502 can also include communication connection(s) 510 that enable communication between the vehicle 502 and other local or remote computing device(s), such as the computing device(s) 532, as well as other remote or local computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 530. For example, the communications connection(s) 510 can enable Wi-Fi-based communication such as via frequencies defined by the IEEE 502.11 standards, short range wireless frequencies such as BLUETOOTH©, or any suitable wired or wireless communications protocol that enables the respective computing device to interface with the other computing device(s).

The direct connection(s) 512 can directly connect the drive system(s) 514 and other systems of the vehicle 502. In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include sensor component(s) to detect conditions of the drive system(s) 514 and/or the surroundings of the vehicle 502. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 514. In some cases, the sensor component(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 514. Furthermore, the drive system(s) 514 also include communication connection(s) that enable communication by the respective drive system with other local or remote computing device(s).

In FIG. 5, the vehicle computing device(s) 504, sensor system(s) 506, emitter(s) 508, and the communication connection(s) 510 are shown onboard the vehicle 502. However, in some examples, the vehicle computing device(s) 504, sensor system(s) 506, emitter(s) 508, and the communication connection(s) 510 can be implemented outside of an actual vehicle (i.e., not onboard the vehicle 502).

As described above, the vehicle 502 can send data to the computing device(s) 532, via the network(s) 530. In some examples, the vehicle 502 can send raw sensor data to the computing device(s) 532. In other examples, the vehicle 502 can send processed sensor data and/or representations of sensor data to the computing device(s) 532 (e.g., data output from the localization component 520, the perception component 522, the prediction component 524, the planner component 526, the machine-learned models, etc.). In some examples, the vehicle 502 can send data to the computing device(s) 532 at a particular frequency, after a lapse of a predetermined period of time, in near real-time, etc.

The computing device(s) 532 can receive the data (raw or processed) from the vehicle 502 and/or other data collection devices, as well as data from one or more third party sources and/or systems. In at least one example, the computing device(s) 532 can include processor(s) 534 and memory 536 communicatively coupled with the processor(s) 534. In the illustrated example, the memory 536 of the computing device(s) 532 stores the event matching component 114, the event timeline component 118, the issue matching component 124, the issue resolving component 134, the user interface component 134, and the issue generation component 138. Additionally, the computing device(s) 532 can include or otherwise be associated with one or more database(s) 538, such as the log database 112, the timeline database 122, and/or the probabilistic database 142 as described herein, as well as other databases. In some examples, the one or more database(s) 538 may be remote from and accessible to the computing device(s) 532.

The processor(s) 516 of the vehicle 502 and the processor(s) 534 of the computing device(s) 532 can be any suitable processor capable of executing instructions to process data and perform operations as described herein. By way of example and not limitation, the processor(s) 516 and 534 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 536 are examples of non-transitory computer-readable media. Memory 518 and 536 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in some examples, components of the vehicle 502 can be associated with the computing device(s) 532 and/or the components of the computing device(s) 532 can be associated with the vehicle 502. That is, the vehicle 502 can perform one or more of the functions associated with the computing device(s) 532, and vice versa.

Furthermore, while the vehicle computing device(s) 504 and the computing device(s) 532 are shown to include multiple components, in some examples, such components can be associated with more or fewer individual components. For example, the localization component 520, the perception component 522, the prediction component 524, the planner component 526, the event matching component 114, the event timeline component 118, the issue matching component 124, the issue resolving component 134, and/or the issue generation component 138 can be combined into a single component. That is, while depicted as separate components, any one or more of the components can be combined.

Figure 6:
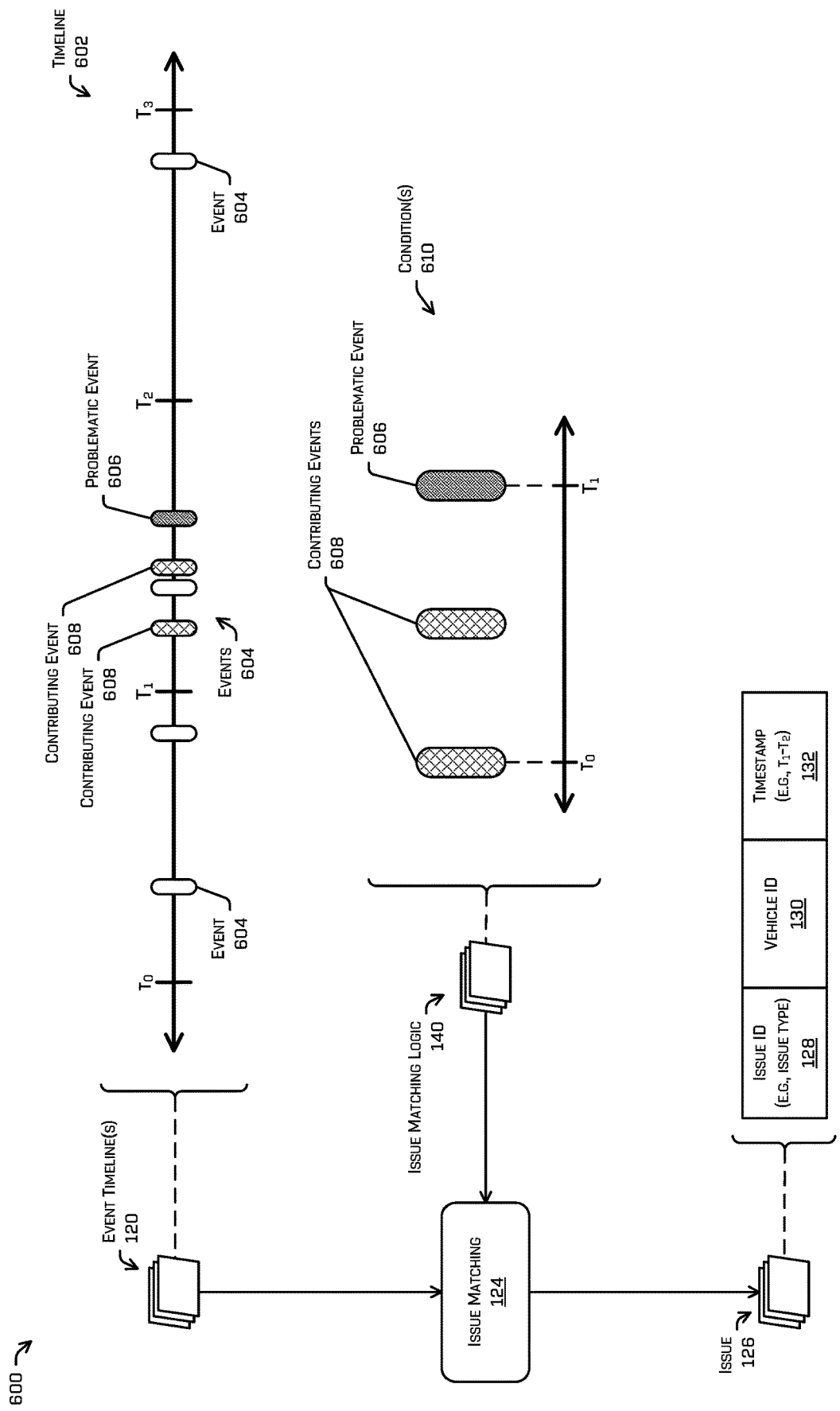
FIG. 6 is a pictorial flow diagram illustrating an example process associated with identifying an occurrence of an issue within an event timeline.

FIG. 6 is a pictorial flow diagram illustrating an example process 600 associated with identifying an occurrence of an issue 126 within an event timeline 120. For instance, an event timeline 120 can be input into an issue matching component 124. Although depicted as a timeline 602 in FIG. 6, other data structures can be utilized to represent an event timeline 120, such as a table, tree, list, record, etc. The timeline 602 includes multiple events 604. Each event of the multiple events 604 may correspond with a specific operation of a vehicle, or a specific system or component of the vehicle. The timeline 602 also includes a problematic event 606 and two contributing events 608, although any number of contributing events 608 to a problematic event may be indicated in an event timeline (e.g., 1, 2, 3, 4, 5, etc.).

The event timeline 120 may be input to the issue matching component 124. The issue matching component 124 may utilize issue matching logic 140 to identify the occurrence of the issue 126 in the event timeline 120. Although shown pictorially in FIG. 6 for ease of illustration and understanding, the issue matching logic 140 may take the form of computer-executable software (e.g., code similar to the pseudocode shown in FIG. 2). The issue matching logic 140 may include one or more condition(s) 610 that, when present in an event timeline 120, the issue matching component 124 will identify as an issue 126. For instance, the condition(s) 610 in the issue matching logic 140 indicate that if the problematic event 606 occurs within a threshold period of time (e.g., from $t_0$ to $t_1$, which may be equivalent to any one of the periods of time between $t_0$-$t_1$, $t_1$-$t_2$, or $t_2$-$t_3$ of the timeline 602) of the two contributing events 608, then the even timeline 120 includes the issue. In some examples, condition(s) 610 of issue matching logic 140 may additionally, or alternatively, specify a sequence (e.g., order) in which contributing events 608 are to occur to match an issue, a threshold period of time between contributing events, or the like.

With respect to the timeline 602, the two contributing events 608 and the problematic event 606 all occur within a period of time between $t_1$-$t_2$ of the timeline 602. The condition(s) 610 specify that the two contributing events 608 and the problematic event 606 must all occur within a threshold period of time that is equal to the period of time from $t_0$-$t_1$ of the timeline 602. As such, the issue matching component 124 may output a match of the issue 126 in the event timeline 120 based on the issue matching logic 140. The issue 126 may indicate the issue identifier 128 (e.g., which may be indicative of an issue type), the vehicle identifier 130 corresponding with the vehicle that is experiencing the issue, and the timestamp 132 associated with when the issue occurred (e.g., between time $t_1$ and $t_2$).

Example Clauses

A. A system comprising: one or more processors; and one or more non-transitory computer-readable media storing instructions that, when executed by the one or more processors, cause the system to perform operations comprising: receiving log data associated with an autonomous vehicle traversing an environment; generating an event timeline based at least in part on the log data, the event timeline comprising a time-ordered record of events associated with operations of the autonomous vehicle; determining that the event timeline includes a problematic event; based at least in part on the event timeline including the problematic event, determining a sequence of events included in the event timeline that at least partially contributed to the problematic event; storing, as an issue associated with the autonomous vehicle, an association between the problematic event and the sequence of events; identifying, in the event timeline and based at least in part on the association, at least a first occurrence of the issue and a second occurrence of the issue; determining a correlation between the first occurrence of the issue and the second occurrence of the issue; and outputting an indication of a potential cause of the issue based at least in part on the correlation.

B. The system as recited in paragraph A, the operations further comprising causing presentation, on a user interface, of a visual representation of the autonomous vehicle traversing the environment at a time corresponding with the first occurrence of the issue.

C. The system as recited in any one of paragraphs A-B, wherein the problematic event is associated with a failure of a component or system of the autonomous vehicle and the sequence of events comprises at least a first event associated with an output of the component or system of the autonomous vehicle.

D. The system as recited in any one of paragraphs A-C, wherein the log data is first log data and the event timeline is a first event timeline, the operations further comprising: generating a second event timeline based at least in part on second log data associated with at least one of the autonomous vehicle or another vehicle; identifying a third occurrence of the issue in the second event timeline based at least in part on the association; and determining the potential cause of the issue based at least in part on another correlation between at least the first occurrence of the issue and the third occurrence of the issue.

E. The system as recited in any one of paragraphs A-D, the operations further comprising: determining an identifier associated with at least one of the autonomous vehicle or the other vehicle associated with the second log data; and determining a timestamp associated with the third occurrence of the issue in the second event timeline.

F. A method comprising: receiving log data associated with a vehicle; generating a first event timeline based at least in part on the log data; identifying, based at least in part on an event included in the first event timeline, a first occurrence of an issue associated with the vehicle; determining a correlation between the first occurrence of the issue and a second occurrence of the issue, the second occurrence of the issue identified in a second event timeline associated with at least one of the vehicle or another vehicle; and outputting a cause of the issue based at least in part on the correlation.

G. The method as recited in paragraph F, wherein the first event timeline comprises a time ordered record of events associated with operations of the vehicle, the time ordered record of events including at least the event.

H. The method as recited in any one of paragraphs F-G, further comprising determining that the first event timeline includes a combination of events, the combination of events including the event, wherein identifying the first occurrence of the issue is based at least in part on the first event timeline including the combination of events.

I. The method as recited in any one of paragraphs F-H, further comprising determining that each event of the combination of events occurred within a threshold period of time, wherein identifying the first occurrence of the issue is based at least in part on the combination of events occurring within the threshold period of time.

J. The method as recited in any one of paragraphs F-I, further comprising receiving, via a user interface, input data indicating a request to associate the event with the issue, wherein identifying the first occurrence of the issue and the second occurrence of the issue is based at least in part on the request.

K. The method as recited in any one of paragraphs F-J, further comprising causing presentation, on a user interface, of a visual representation of the vehicle traversing an environment at a time corresponding with the first occurrence of the issue.

L. The method as recited in any one of paragraphs F-K, further comprising causing presentation of the first event timeline on a user interface, the first event timeline including an input corresponding with the event.

M. The method as recited in any one of paragraphs F-L, further comprising determining that the first occurrence of the issue is an earliest occurrence of the issue across an aggregation of event timelines including at least the first event timeline and the second event timeline, and wherein determining the cause of the issue is further based at least in part on the first occurrence of the issue being the earliest occurrence of the issue.

N. The method as recited in any one of paragraphs F-M, wherein the second event timeline is associated with the vehicle, the method further comprising determining that the issue is specific to the vehicle based at least in part on an absence of the issue from one or more other event timelines associated with one or more other vehicles.

O. The method as recited in any one of paragraphs F-N, wherein the issue comprises an error associated with operation of at least one of a component or system of the vehicle.

P. The method as recited in any one of paragraphs F-O, wherein: the issue is associated with a behavior of the vehicle; and the event is associated with an output of at least one of a prediction component of the vehicle, a perception component of the vehicle, a planner component of the vehicle, or a localization component of the vehicle.

Q. One or more non-transitory computer-readable media storing instructions that, when executed, cause one or more processors to perform operations comprising: receiving log data associated with a vehicle; generating a first event timeline based at least in part on the log data; identifying, based at least in part on an event included in the first event timeline, a first occurrence of an issue associated with the vehicle; determining a correlation between the first occurrence of the issue and a second occurrence of the issue, the second occurrence of the issue identified in a second event timeline associated with at least one of the vehicle or another vehicle; and determining a cause of the issue based at least in part on the correlation.

R. The one or more non-transitory computer-readable media as recited in paragraph Q, wherein the first event timeline comprises a time-ordered record of events associated with operations of the vehicle, the time ordered record of events including at least the event.

S. The one or more non-transitory computer-readable media as recited in any one of paragraphs Q-R, the operations further comprising determining that the first event timeline includes a combination of events, the combination of events including the event, wherein identifying the first occurrence of the issue is based at least in part on the first event timeline including the combination of events.

T. The one or more non-transitory computer-readable media as recited in any one of paragraphs Q-S, further comprising determining that each event of the combination of events occurred within a threshold period of time, wherein identifying the first occurrence of the issue is based at least in part on the combination of events occurring within the threshold period of time.

U. The one or more non-transitory computer-readable media as recited in any one of paragraphs Q-T, wherein: the issue is associated with a behavior of the vehicle; and the event is associated with an output of at least one of a prediction component of the vehicle, a perception component of the vehicle, a planner component of the vehicle, or a localization component of the vehicle.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving log data associated with an autonomous vehicle traversing an environment;
generating an event timeline based at least in part on the log data, the event timeline comprising a time-ordered record of events associated with operations of the autonomous vehicle;
determining that the event timeline includes a problematic event;
based at least in part on the event timeline including the problematic event, determining one or more contributing events included in the event timeline, an individual contributing event of the one or more contributing events at least partially contributing to the problematic event;
storing, as an issue associated with the autonomous vehicle, an association between the problematic event and the one or more contributing events;
identifying, in the event timeline and based at least in part on the association, at least a first occurrence of the issue and a second occurrence of the issue;
determining a correlation between the first occurrence of the issue and the second occurrence of the issue; and
outputting an indication of a potential cause of the issue based at least in part on the correlation.

2. The system of claim 1, the operations further comprising causing presentation, on a user interface, of a visual representation of the autonomous vehicle traversing the environment at a time corresponding with the first occurrence of the issue.

3. The system of claim 1, wherein the problematic event is associated with a failure of a component or system of the autonomous vehicle and the one or more contributing events comprises at least a first event associated with an output of the component or system of the autonomous vehicle.

4. The system of claim 1, wherein the log data is first log data and the event timeline is a first event timeline, the operations further comprising:
generating a second event timeline based at least in part on second log data associated with at least one of the autonomous vehicle or another vehicle;
identifying a third occurrence of the issue in the second event timeline based at least in part on the association; and
determining the potential cause of the issue based at least in part on another correlation between at least the first occurrence of the issue and the third occurrence of the issue.

5. A method comprising:
receiving log data associated with a vehicle;
generating an event timeline based at least in part on the log data;
identifying, based at least in part on a contributing event included in the event timeline, a first occurrence of an issue associated with the vehicle and a second occurrence of the issue, the second occurrence of the issue associated with at least one of the vehicle or another vehicle;
determining a correlation between the first occurrence of the issue and the second occurrence of the issue; and
outputting a cause of the issue based at least in part on the correlation.

6. The method of claim 5, wherein the event timeline comprises a time-ordered record of events associated with operations of the vehicle, the time-ordered record of events including at least the contributing event.

7. The method of claim 5, further comprising determining that the event timeline includes a combination of events, the combination of events including the contributing event, wherein identifying the first occurrence of the issue is based at least in part on the event timeline including the combination of events.

8. The method of claim 7, further comprising determining that each event of the combination of events occurred within a threshold period of time, wherein identifying the first occurrence of the issue is based at least in part on the combination of events occurring within the threshold period of time.

9. The method of claim 5, further comprising receiving, via a user interface, input data indicating a request to associate the contributing event with the issue, wherein identifying the first occurrence of the issue and the second occurrence of the issue is based at least in part on the request.

10. The method of claim 5, further comprising causing presentation, on a user interface, of a visual representation of the vehicle traversing an environment at a time corresponding with the first occurrence of the issue.

11. The method of claim 5, further comprising causing presentation of the event timeline on a user interface, the event timeline including an input corresponding with the contributing event.

12. The method of claim 5, further comprising determining that the first occurrence of the issue is an earliest occurrence of the issue across an aggregation of event timelines including at least the event timeline and an additional event timeline, and wherein determining the cause of the issue is further based at least in part on the first occurrence of the issue being the earliest occurrence of the issue.

13. The method of claim 5, further comprising determining that the issue is specific to the vehicle based at least in part on an absence of the issue from one or more other event timelines associated with one or more other vehicles.

14. The method of claim 5, wherein the issue comprises an error associated with operation of at least one of a component or system of the vehicle.

15. The method of claim 5, wherein:
the issue is associated with a behavior of the vehicle; and
the contributing event is associated with an output of at least one of a prediction component of the vehicle, a perception component of the vehicle, a planner component of the vehicle, or a localization component of the vehicle.

16. One or more non-transitory computer-readable media storing instructions that, when executed, cause one or more processors to perform operations comprising:
receiving log data associated with a vehicle;
generating an event timeline based at least in part on the log data;
identifying, based at least in part on a contributing event included in the event timeline, a first occurrence of an issue associated with the vehicle and a second occurrence of the issue, the second occurrence of the issue associated with at least one of the vehicle or another vehicle;
determining a correlation between the first occurrence of the issue and the second occurrence of the issue; and
determining a cause of the issue based at least in part on the correlation.

17. The one or more non-transitory computer-readable media of claim 16, wherein the event timeline comprises a time-ordered record of events associated with operations of the vehicle, the time-ordered record of events including at least the contributing event.

18. The one or more non-transitory computer-readable media of claim 16, the operations further comprising determining that the event timeline includes a combination of events, the combination of events including the contributing event, wherein identifying the first occurrence of the issue is based at least in part on the event timeline including the combination of events.

19. The one or more non-transitory computer-readable media of claim 18, further comprising determining that each event of the combination of events occurred within a threshold period of time, wherein identifying the first occurrence of the issue is based at least in part on the combination of events occurring within the threshold period of time.

20. The one or more non-transitory computer-readable media of claim 16, wherein:
the issue is associated with a behavior of the vehicle; and
the contributing event is associated with an output of at least one of a prediction component of the vehicle, a perception component of the vehicle, a planner component of the vehicle, or a localization component of the vehicle.

* * * * *